(12) United States Patent
Han

(10) Patent No.: US 6,321,089 B1
(45) Date of Patent: Nov. 20, 2001

(54) REVERSE LINK SOFT HAND OFF METHOD

(75) Inventor: Jong Sun Han, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/348,479

(22) Filed: Jul. 7, 1999

(30) Foreign Application Priority Data

Jul. 10, 1998 (KR) .................................................. 98/27902

(51) Int. Cl.[7] ........................................................ H04Q 7/20
(52) U.S. Cl. .......................................... 455/438; 455/442
(58) Field of Search ..................................... 455/436, 437, 455/438, 442, 525; 370/331, 332

(56) References Cited

U.S. PATENT DOCUMENTS

| 5,508,708 | 4/1996 | Ghosh et al. ......................... 342/457 |
| 5,594,718 | 1/1997 | Weaver, Jr. et al. .................. 370/331 |

*Primary Examiner*—Nguyen T. Vo
(74) *Attorney, Agent, or Firm*—Fleshner & Kim, LLP

(57) ABSTRACT

Reverse link soft hand off method for improving a reverse link communication quality in a CDMA cellular communication system having a plurality of base stations, at least one mobile station, and at least one base station controller, including the step of a particular mobile station being handed off from a first channel on a serving base station to a second channel on a target base station, if a reverse link traffic signal strength or a reverse link pilot signal strength for the particular mobile station measured at a target base station exceeds a preset threshold.

12 Claims, 3 Drawing Sheets

REVERSE LINK SOFT HAND OFF METHOD

BACKGROUND OF THE INVENTION

1. Field of the Invention

The present invention relates to a mobile communication system, and more particularly, to a reverse link soft hand off method for improving a reverse link communication quality in a CDMA cellular communication system.

2. Background of the Related Art

In general, a cellular communication system is provided with a hand off function for permitting a mobile station to have a radio link kept continuously when the mobile station roams from an area of a serving base station giving a service presently to a service area of new base station. In the hand off which is a feature coming from a mobility of the mobile station, the mobile station shifts a call underway presently to a target base station by keep searching signal strengths of the serving base station giving a service to the mobile station presently and base stations around the mobile station and comparing the signal strengths of the searched base stations. Eventually, a good communication quality can be maintained because the mobile station is permitted to keep the communication through a communication channel secured newly according to the hand off function. In the hand off of the CDMA cellular communication system, there are a hard hand off a momentary cut off of the communication is occurred, and a soft hand-off call is continuous without cut off of the communication. The hard hand off is made mostly between switching centers between which no radio link for the soft hand off is not established, and the soft hand off is made between a plurality of base stations around a mobile station having identical frequencies assigned thereto. A radio link from the base station to the mobile station is defined to be a forward link and a radio link from the mobile station to the base station is defined to be a reverse link.

FIG. 1 illustrates a part of a CDMA cellular communication system, referring to which a related art soft hand off will be explained.

CDMA channels having identical frequencies assigned thereto, but having offsets different from each other are used between a mobile station 1 and each base station 2, 3 and 4. The mobile station 1 keeps tracing a pilot channel in the CDMA channels of the forward link, and the each base station 2, 3 and 4 transmits a pilot signal to the mobile station 1 through pilot channels of sequence offsets different from each other. Then, the mobile station 1 respectively measures pilot signal strengths of forward links received from the base stations 3 and 4 around the mobile station 1 inclusive of the first base station 2 which is a serving base station to the mobile station presently, and compares to a preset threshold. The preset threshold is an ADD threshold and a DROP threshold. The ADD threshold is a lowest base station signal strength at which an available communication channel can be sustained, and the DROP threshold is a highest base station signal strength at which release of an unavailable communication channel is required. The mobile station 1 transmits a signal strength message to the first base station 2 when the mobile station 1 finds out that the pilot signal strength of the first base station 2 drops below the DROP threshold as a result of comparison of the pilot signal strengths of the forward link to the preset thresholds or finds out a pilot signal having a strength substantially higher than a strength of the pilot signal from the first base station 2. If the pilot signal strength of the first base station 2 drops below the DROP threshold and only the pilot signal strength of the second base station among the pilot signal strengths of the forward links measured at the mobile station 13 is higher than the ADD threshold on the same time, the mobile station 1 transmits a signal strength message having the pilot signal strength of the second base station 3 recorded thereon to the first base station 2. Then, the first base station 2 reports the received signal strength message to a base station controller 10, and a call control processor 11 in the base station controller 10 analyzes the received signal strength message. The call control processor 11 instructs a soft hand off for the mobile station to the first base station 2 and the second base station 3 according to a result of the signal strength message analysis. At the end, the communication channel between the mobile station 1 and the first base station 2 is released and a new communication channel between the mobile station 1 and the second base station 3 is established. In this instance, the second base station 3 is a target base station for the soft hand off of the mobile station 1.

The procedure of the soft hand off explained up to now is on a forward link soft hand off, in which both direction hand off is conducted upon reception of the hand off message based on the forward link pilot signal strength. Thus, the CDMA cellular communication system has further improved a forward link communication quality by the forward link soft hand off. Opposite to this, it is generally accepted fact that a reverse link has a communication quality lower than the forward link due to a shadow effect, a corner effect, and a scattering effect. In other words, the reverse link has a communication quality significantly lower than in the case of the forward link because the communication quality is affected by the shadow effect occurred when the mobile station is surrounded by obstacles such as high buildings, the corner effect occurred when the mobile station turns around a corner, or the scattering effect in which a signal is scattered irregularly in the vicinity of the mobile station. For example, if a particular mobile station transmits a signal to a serving base station during moving in a region surrounded by high buildings, though the signal is attenuated by the shadow effect, other signals from other mobile stations around the particular mobile station, which act as noises to the signal from the particular mobile station, are not attenuated, resulting in an inevitable deterioration of the reverse link communication quality as a signal to noise ratio of the reverse link is dropped in view of the serving base station. Nevertheless, as explained, even though the related art CDMA only has employed the forward link soft hand off in which the soft hand off is made for both directions based on the forward link pilot signal strength, no soft hand off based on a reverse link mobile station signal strength has been suggested.

SUMMARY OF THE INVENTION

Accordingly, the present invention is directed to a reverse link soft hand off method that substantially obviates one or more of the problems due to limitations and disadvantages of the related art.

An object of the present invention is to provide a reverse link soft hand off method for improving a reverse link communication quality dropped by a shadow effect, a corner effect, or a scattering effect.

Other object of the present invention is to provide a reverse link soft hand off method which can be independently conducted on a reverse link based on a traffic signal strength or a pilot signal strength on the reverse link.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the soft hand off method in a communication system including a plurality of base stations, at least one mobile station, and at least one base station controller, includes the steps of comparing a reverse link traffic signal strength or a reverse link pilot signal strength of a particular mobile station measured at a serving base station to a first threshold preset at the serving base station; reporting the signal strength measured at the serving base station to the base station controller in a case when the signal strength is lower than the first threshold as a result of the comparison; the base station controller instructing the base stations around the particular mobile station to measure the reverse link traffic signal strength or the reverse link pilot signal strength of the particular mobile station when the base station controller receives the report on the signal strength; and, the particular mobile station being handed off from a first channel on the serving base station to a second channel on the target base station according to a result of the signal strength measured at the base stations around the particular mobile station.

Preferably, the base station controller designates one of the base stations having the reverse link signal strength higher than a second threshold as the target base station according to results of the signal strengths measured at the base stations, and instructs the serving base station and the target base station to make a soft hand off for the mobile station.

The first threshold is determined between a second threshold, which is a reverse link signal strength for adding a new communication channel between the particular mobile station and the serving base station, and a third threshold, which is a reverse link signal strength requiring release of an communication channel between the particular mobile station and the serving base station in a reverse link soft handoff, and a window defined as a difference between the second threshold and the third threshold is determined to be relatively smaller than a window defined as a difference between a lowest forward link signal strength for sustaining an available communication channel between the particular mobile station and the serving base station at a forward link hand off for the particular mobile station, and a highest forward link signal strength requiring release of an unavailable communication channel between the particular mobile station and the serving base station.

Finally, the base stations around the particular mobile station are sorted as an active set, a candidate set, and a neighbor set, which is a list of potential base stations to be involved in a hand off of the particular mobile station, and the list of potential base stations have priorities in an order of the active set, the candidate set, and the neighbor set on the reverse link soft hand off according to the reverse link signal strength of the particular mobile station. An outer loop power control for the particular mobile station is conducted in parallel with a number of added base station to the active set.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
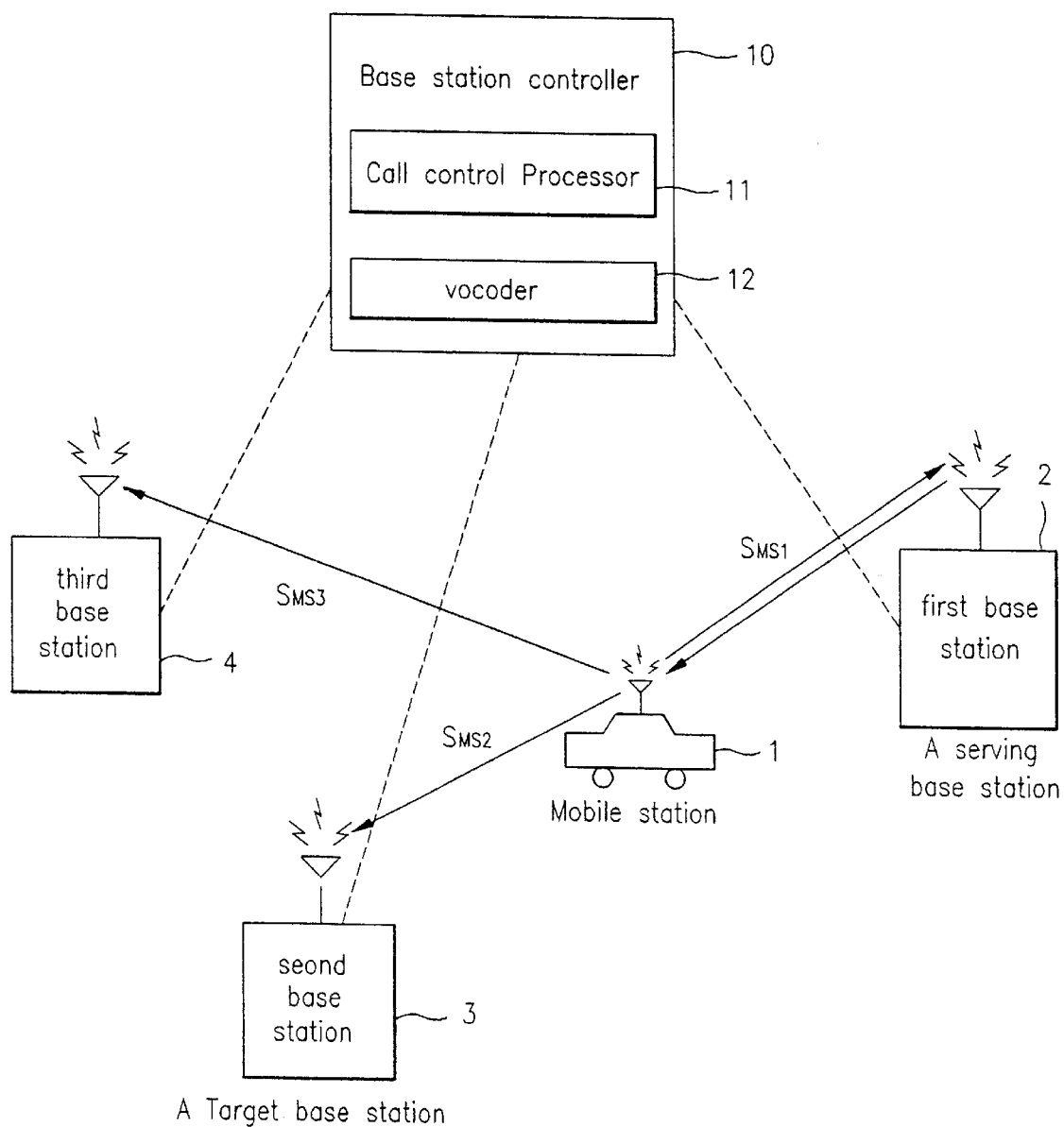
FIG. 1 illustrates a part of a CDMA cellular communication system.
Figure 2:
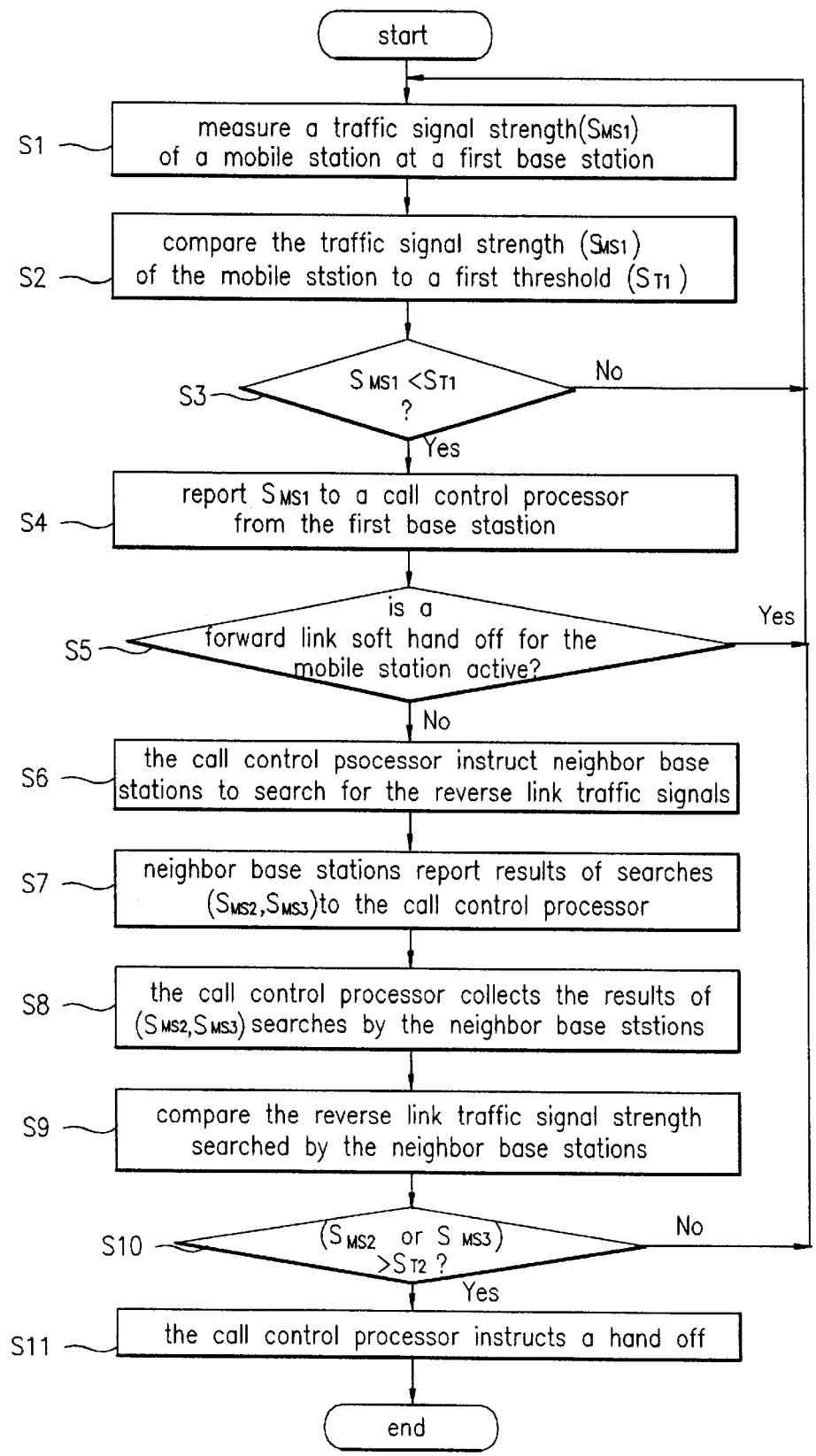
FIG. 2 illustrates a flow chart showing a reverse link soft hand off procedure in accordance with a preferred embodiment of the present invention; and, FIG. 3 illustrates thresholds for conducting a reverse link soft hand off procedure in accordance with a preferred embodiment of the present invention.
Figure 3:
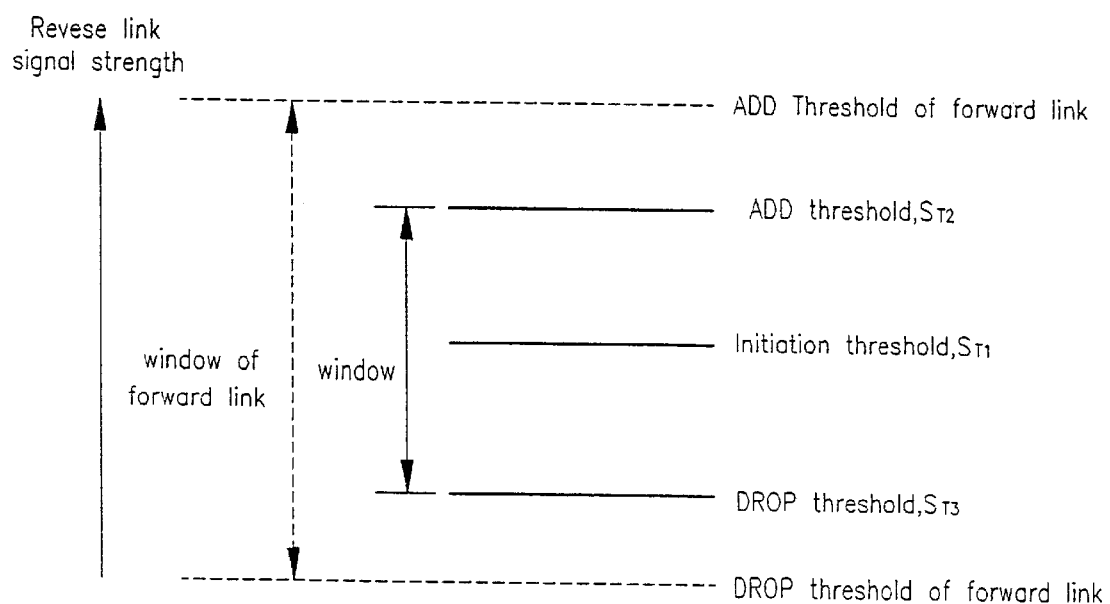

Reference will now be made in detail to the preferred embodiments of the present invention, examples of which are illustrated in the accompanying drawings. FIG. 2 illustrates a flow chart showing a reverse link soft hand off procedure in accordance with a preferred embodiment of the present invention, and FIG. 3 illustrates thresholds for conducting a reverse link soft hand off procedure in accordance with a preferred embodiment of the present invention. In explanation of the reverse link soft hand off procedure of the present invention, the CDMA cellular communication system shown in FIG. 1 will be referred. The reverse link soft hand off procedure in accordance with a preferred embodiment of the present invention may be take into consideration if the aforementioned forward link soft hand off is inactive. In the present invention, the first base station 2 is a serving base station of the mobile station 1 presently, and the base stations 2, 3 and 4 may be an active set, a candidate set, and a neighbor set depending on a reverse link signal strength to the mobile station 1. A list of the base stations, potential base stations which may make the reverse link soft hand off to the mobile station 1, have priorities in an order of the active set, the candidate set, and the neighbor set. Therefore, the second base station 3 and the third base station 4 fall on the neighbor set or the candidate set in the list of the base stations. In addition to this, as shown in FIG. 3, a first threshold(=an initiation threshold, $S_{T1}$), a second threshold(=an ADD threshold, $S_{T2}$) for the reverse link soft hand off, and a third threshold(=DROP threshold, $S_{T3}$) are used for the reverse link soft hand off in the present invention. The first threshold $S_{T1}$ is variably set between the second threshold $S_{T2}$ and the third threshold $S_{T3}$, and a size of a hand off window of reverse link which is a difference of the second threshold $S_{T2}$ and the third threshold $S_{T3}$ is set smaller than a handoff window of forward link which is a difference of the ADD threshold and the DROP threshold in the existing forward link soft handoff. The second threshold $S_{T2}$ is a lowest reverse link signal strength which can sustain an available communication channel between the mobile station 1 and the base station 2, 3, and 4, and the third threshold $S_{T3}$ is a highest reverse link signal strength which requires to release an unavailable communication channel between the mobile station 1 and the base station 2, 3, and 4.

Under this setup, the first base station 2, the serving base station, measures a traffic signal strength $S_{MS1}$ from the mobile station 1(S1). Alternatively, the first base station 2 may measure a pilot signal strength from the mobile station 1. Then, the first base station 2 compares the traffic signal strength $S_{MS1}$ to a first threshold $S_{T1}$ (S2) of its own preset in advance. If it is determined that the traffic signal strength $S_{MS1}$ from the mobile station 1 is lower than the first threshold $S_{T1}$(S3) as a result of the comparison, the first base station 2 reports the measured traffic signal strength $S_{MS1}$ to the call control processor 11 in the base station controller 10(S4). The call control processor 11 determines a forward link soft hand off of being active for the mobile station 1 presently(S5). As explained, since the present invention takes the case into consideration, in which no forward link soft hand off is active, the call control processor 11 instructs the second base station 3 and the third base station 4 which fall on the neighbor set or the candidate set to search for a reverse link traffic signal from the mobile station 1(S6). Alternatively, in this case too, the call control processor 11 may instruct the second base station 3 and the third base station 4 to search for a reverse link pilot signal from the mobile station 1. Then, the second base station 3 and the third base station 4 searches for the traffic signal from the mobile station 1 according to the instruction from the call control processor 11 using searching channels assigned to the respective base stations 2, 3 and 4. The searching channels may be assigned newly for searching for the reverse link traffic signal or the reverse link pilot signal or may use the present channels used for the forward links in common. In other words, for the reverse link soft hand off of the present invention, a separate modem may be provided additionally for searching for the traffic channel or the pilot channel, or a modem used for transmission of a pilot channel or a synchronizing channel on the forward link may be used in common as the case demands. This searching channel is also used when the first base station 2, the serving base station, reports the measured traffic signal strength $S_{MS1}$ of the mobile station I to the call control processor 11.

Then, when the second and third base stations 3and 4 report the traffic signal strengths $S_{MS2}$ and $S_{MS3}$ of the mobile station 1, results of the search, to the call control processor 11(S7), the call control processor 11 collects results of the searches done by base stations 3 and 4 around the mobile station 1(S8). The call control processor 11 compares the traffic signal strengths $S_{MS2}$ and $S_{MS3}$ collected from the base stations 3 and 4 and the traffic signal strength $S_{MS1}$ reported from the first base station 2(S9), to select a target base station for making the mobile station to be soft handed off as a result of the comparison(S10). The target base station is a base station the measured reverse link signal strength of which exceeds the second threshold ST2, the ADD threshold, which is assumed to be the second base station 3 in the present invention. Eventually, as the call control processor 11 instructs the second base station 3, the first base station 2 and the vocoder 12 a hand off for the mobile station 1(S11), a new communication channel between the mobile station 1 and the second base station is established while a communication channel already established between the mobile station 1 and the first base station 2 is maintained(S11).

In the reverse link soft hand off method of the present invention explained up to now, an outer loop power control on the mobile station 1 is carried out in parallel with a number of the base stations added to the active group by the soft hand off of the present invention. That is, in a case when the number of base stations added to the active group is increased, the control is made in a direction to reduce a transmission signal power of the mobile station 1, and, in a case when the number of base stations added to the active group is decreased, the control is made in a direction to increase a transmission signal power of the mobile station 1.

As has been explained, the reverse link soft hand off method of the present invention can improve a reverse link communication quality deteriorated by a shadow effect, a corner effect, and a scattering effect. And, the reverse link soft hand off method of the present invention can dispense with additional allocation of radio physical channel for searching a reverse link signal as well as transmission/reception of a signal processing message for carrying out the soft hand off procedure, preventing occurrence of additional interference under a radio environment caused by the reverse link soft hand off procedure of the present invention.

It will be apparent to those skilled in the art that various modifications and variations can be made in the reverse link soft hand off method of the present invention without departing from the spirit or scope of the invention. Thus, it is intended that the present invention cover the modifications and variations of this invention provided they come within the scope of the appended claims and their equivalents.

What is claimed is:

1. A reverse link soft hand off method in a communication system including a plurality of base stations, at least one mobile station, and at least one base station controller, the method comprising:

a particular mobile station being independently handed off from a first channel on a serving base station to a second channel on a target base station, if a reverse link traffic signal strength or a reverse link pilot signal strength for the particular mobile station measured at the target base station exceeds a preset threshold and a forward link hand off is not established.

2. A soft hand off method in a communication system including a plurality of base stations, at least one mobile station, and at least one base station controller, the method comprising:

(1) comparing a reverse link traffic signal strength or a reverse link pilot signal strength of a particular mobile station measured at a serving base station to a first threshold preset at the serving base station;

(2) reporting the signal strength measured at the serving base station to the base station controller in a case when the signal strength is lower than the first threshold as a result of the comparison;

(3) the base station controller instructing the base stations around the particular mobile station to measure the reverse link traffic signal strength or the reverse link pilot signal strength of the particular mobile station when the base station controller receives the report on the signal strength; and (4) the particular mobile station being independently handed off from a first channel on the serving base station to a second channel on the target base station according to a result of the signal strength measured at the base stations around the particular mobile station and a forward link hand off is not established.

3. A method as claimed in claim 2, wherein the base station controller designates one of the base stations at which a signal strength is higher than a second threshold as the target base station according to the result of the signal strengths measured at the base stations.

4. A method as claimed in claim 2, wherein the first threshold $S_{T1}$ is determined between a second threshold, which is a reverse link signal strength for adding a new communication channel between the particular mobile station and the serving base station in reverse link soft handoff, and a third threshold, which is a reverse link signal strength requiring release of an communication channel between the particular mobile station and the serving base station in reverse link soft handoff.

5. A method as claimed in claim 4, wherein a window defined as a difference between the second threshold and the third threshold is determined to be relatively smaller than a window defined as a difference between a forward link signal strength for adding a new communication channel between the particular mobile station and the serving base station at a forward link hand off for the particular mobile station, and a forward link signal strength requiring release of an communication channel between the particular mobile station and the serving base station in reverse link soft handoff.

6. A method as claimed in claim 2, further comprising assigning at least one searching channel between the serving base station and the base stations around the particular mobile station for searching the reverse link traffic signal or the reverse link pilot signal.

7. A method as claimed in claim 6, wherein a separate modem is additionally provided for searching the traffic channel or the pilot channel.

8. A method as claimed in claim 7, wherein a modem used for transmission of a forward link pilot channel or a synchronizing channel is used in common with the reverse link soft hand off.

9. A method as claimed in claim 2, wherein the base stations around the particular mobile station are sorted as an active set, a candidate set, and a neighbor set, which is a list of potential base stations based on priorities to be involved in a hand off of the particular mobile station.

10. A method as claimed in claim 9, wherein the particular mobile station is controlled such that a transmission signal power thereof is decreased if a number of base stations added to the active set is increased, and such that the transmission signal power thereof is increased if the number of base stations added to the active set is decreased.

11. A reverse link soft hand off method in a CDMA cellular communication system including a plurality of base stations, at least one base station, and at least one mobile station controller, the method comprising:

a particular mobile station being independently handed off from a channel on a serving base station to another channel on a target base station, if a reverse link communication quality of the particular mobile station is relatively lower than a forward link communication quality of the particular mobile station and a forward link hand off is not established.

12. A soft hand off method in a communication system including a plurality of base stations, at least one mobile station, and at least one base station controller, the method comprising:

(1) comparing a reverse link traffic signal strength or a reverse link pilot signal strength of a particular mobile station measured at a serving base station to a first threshold preset at the serving base station;

(2) reporting the signal strength measured at the serving base station to the base station controller in a case when the signal strength is lower than the first threshold as a result of the comparison;

(3) the base station controller instructing the base stations around the particular mobile station to measure the reverse link traffic signal strength or the reverse link pilot signal strength of the particular mobile station when the base station controller receives the report on the signal strength; and (4) the particular mobile station being handed off from a first channel on the serving base station to a second channel on the target base station according to a result of the signal strength measured at the base stations around the particular mobile station, wherein the first threshold $S_{T1}$ is determined between a second threshold, which is a reverse link signal strength for adding a new communication channel between the particular mobile station and the serving base station in reverse link soft handoff, and a third threshold, which is a reverse link signal strength requiring release of an communication channel between the particular mobile station and the serving base station in reverse link soft handoff, and wherein a window defined as a difference between the second threshold and the third threshold is determined to be relatively smaller than a window defined as a difference between a forward link signal strength for adding a new communication channel between the particular mobile station and the serving base station at a forward link hand off for the particular mobile station, and a forward link signal strength requiring release of an communication channel between the particular mobile station and the serving base station in reverse link soft handoff.

* * * * *